(12) United States Patent
Kinoto et al.

(10) Patent No.: US 11,987,244 B2
(45) Date of Patent: May 21, 2024

(54) VEHICLE CONTROL METHOD AND VEHICLE CONTROL DEVICE

(71) Applicant: Nissan Motor Co., Ltd., Yokohama (JP)

(72) Inventors: Hidemasa Kinoto, Kanagawa (JP); Hiroshi Arita, Kanagawa (JP); Hideki Kawashima, Kanagawa (JP); Hiroaki Kawamura, Kanagawa (JP); Yuuya Kogure, Kanagawa (JP); Masahiro Iriyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 53 days.

(21) Appl. No.: 17/998,681

(22) PCT Filed: May 15, 2020

(86) PCT No.: PCT/JP2020/019423
§ 371 (c)(1),
(2) Date: Nov. 14, 2022

(87) PCT Pub. No.: WO2021/229790
PCT Pub. Date: Nov. 18, 2021

(65) Prior Publication Data
US 2023/0174064 A1 Jun. 8, 2023

(51) Int. Cl.
*B60W 30/16* (2020.01)
*B60W 10/18* (2012.01)
*B60W 30/18* (2012.01)

(52) U.S. Cl.
CPC ............ *B60W 30/16* (2013.01); *B60W 10/18* (2013.01); *B60W 30/18109* (2013.01); *B60W 2540/12* (2013.01)

(58) Field of Classification Search
CPC ........... B60W 30/16; B60W 30/18109; B60W 10/18; B60W 2540/12
See application file for complete search history.

(56) References Cited

U.S. PATENT DOCUMENTS

| | | | |
|---|---|---|---|
| 2005/0269876 A1* | 12/2005 | Higuchi | B60T 7/12 303/155 |
| 2009/0076701 A1* | 3/2009 | Inoue | B60W 30/18118 701/93 |
| 2010/0114450 A1* | 5/2010 | Huang | B60K 31/00 701/93 |
| 2013/0082514 A1 | 4/2013 | Murakami et al. | |

(Continued)

FOREIGN PATENT DOCUMENTS

| | | |
|---|---|---|
| DE | 10 2011 083 304 A1 | 5/2012 |
| JP | 2005-1566 A | 1/2005 |

(Continued)

*Primary Examiner* — George C Jin
(74) *Attorney, Agent, or Firm* — Global IP Counselors, LLP

(57) ABSTRACT

A drive source controller is configured to control a drive torque of a drive source that drives a vehicle. The drive source controller is configured to prohibit acceptance of drive source required torque from a cruise controller when automatic braking control is activated during cruise control, or not output the drive source required torque to the drive source controller when the automatic braking control is activated during the cruise control.

6 Claims, 3 Drawing Sheets

(56) References Cited

U.S. PATENT DOCUMENTS

| | | | |
|---|---|---|---|
| 2013/0226425 A1* | 8/2013 | Oliveira | B60T 7/122 |
| | | | 701/70 |
| 2017/0217436 A1 | 8/2017 | Inomata | |
| 2018/0079313 A1* | 3/2018 | Foitzik | B60T 13/741 |
| 2020/0172067 A1* | 6/2020 | Einig | B60T 7/042 |
| 2021/0129819 A1* | 5/2021 | Vollert | B60T 13/745 |
| 2024/0059345 A1* | 2/2024 | Xu | B62D 5/0469 |

FOREIGN PATENT DOCUMENTS

| | | |
|---|---|---|
| JP | 2009-262709 A | 11/2009 |
| JP | 2015-44432 A | 3/2015 |
| JP | 2017-138740 A | 8/2017 |
| JP | 2017-197019 A | 11/2017 |
| JP | 2019-155992 A | 9/2019 |

\* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2020/019423, filed on May 15, 2020.

BACKGROUND

Technical Field

The present invention relates to a control method and a control device for a vehicle equipped with cruise control for driving at a constant speed or following a preceding vehicle.

Background Information

Japanese Laid-Open Patent Application No. 2005-1566 (Patent Document 1) discloses a technology in which cruise control is suspended when a driver performs a brake pedal depression operation during cruise control and restores cruise control from the suspended state when the depression operation is released.

SUMMARY

When cruise control is temporarily stopped using the conventional technology, a redundant system is used that requires two detection means (such as a stroke sensor and a brake switch) to make the determination that the driver has depressed the brake pedal. Here, when a braking torque is generated by automatic braking, if there is an actuator that causes a stroke of the brake pedal regardless of a brake pedal operation by the driver, the brake switch turns on, which makes it difficult to ensure a redundant system using a brake switch.

An object of the present invention is to provide a vehicle control method and a vehicle control device that can ensure a redundant system when cruise control is temporarily stopped by another means besides a brake switch.

In order to realize the object described above, in the present invention, in a drive source control unit that controls the drive torque of a drive source that drives a vehicle, when automatic braking control is activated during cruise control, the acceptance of drive source required torque from a cruise control unit is prohibited. Alternatively, the cruise control unit does not output the drive source required torque to the drive source control unit when the automatic brake control is activated during the cruise control.

Thus, even if the brake switch is turned on by the automatic braking while the driver is not depressing the brake pedal, and the depression of the brake pedal by the driver cannot be detected based on the brake switch, the drive source control unit can prohibit acceptance of the drive source required torque in advance, or the cruise control unit does not output drive source required torque to the drive source control unit, and thereby ensure a redundant system when it is determined whether to suspend the cruise control.

BRIEF DESCRIPTION OF THE DRAWINGS

Referring now to the attached drawings which form a part of this original disclosure.

DETAILED DESCRIPTION OF EMBODIMENTS

Figure 1:
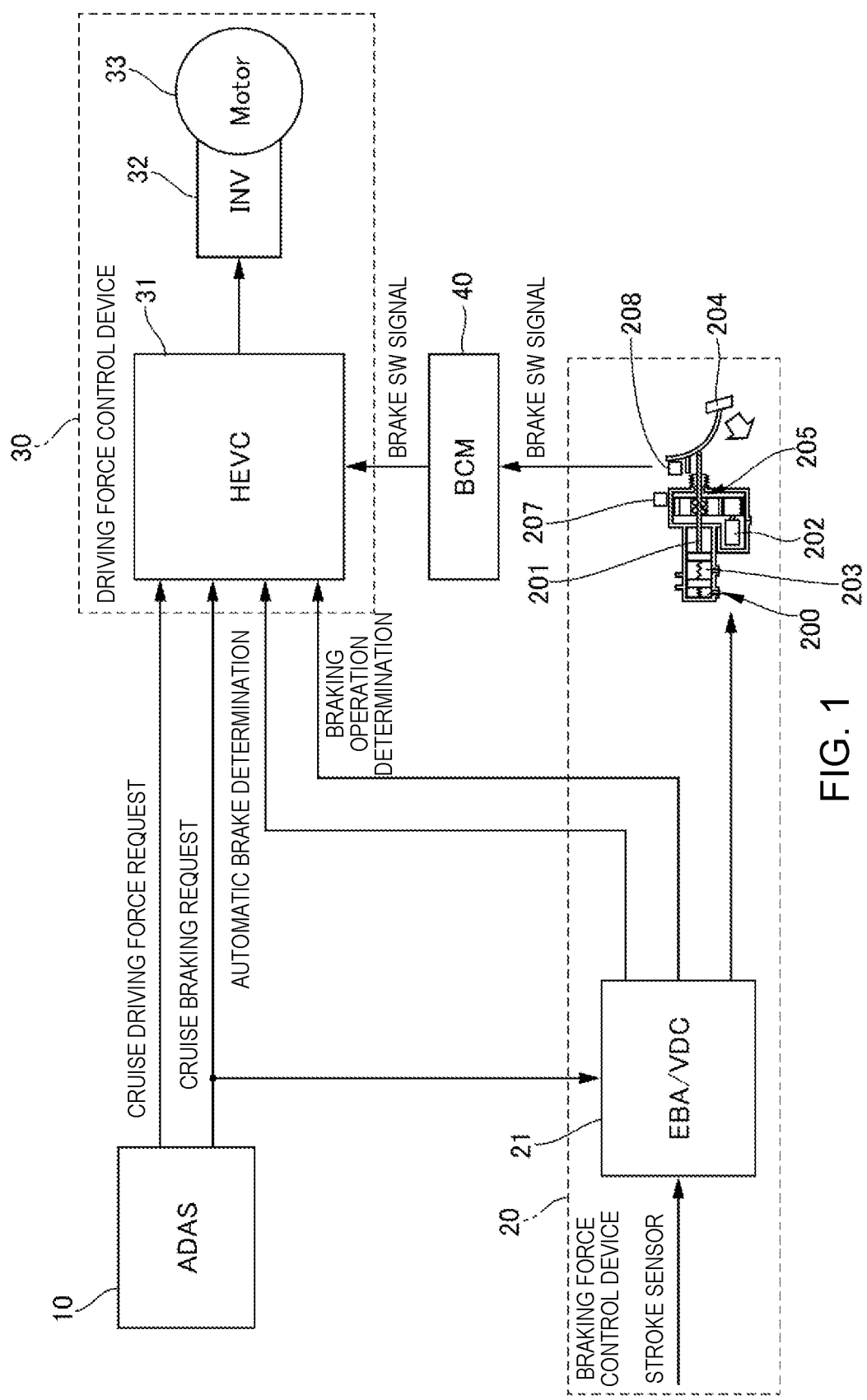
FIG. 1 is a system diagram of a vehicle control device that can execute cruise control in a first embodiment.

FIG. 1 is a system diagram of a vehicle control device that can execute cruise control in a first embodiment. A vehicle equipped with the vehicle control device of the first embodiment is an electrically driven vehicle that travels by using an electric motor for driving 33. The vehicle is not limited in this way and may be a hybrid vehicle that uses an internal combustion engine to drive a generator and runs on its electric power, or a normal engine-powered vehicle without being limited to a hybrid vehicle. An advanced driving assistance system (hereinafter referred to as ADAS) 10 ascertains the vehicle's external environment based on various sensor signals, such as radar, stereo camera, and GPS, and provides various types of driving assistance controls (hereinafter referred to as cruise control) such as following travel control in which a preceding vehicle is followed at a maintained constant inter-vehicular distance.

Cruise control is operated, for example, by a cruise control switch provided on the steering column. To set the cruise control, the driver turns the cruise control switch ON, thereby setting the travel speed and the inter-vehicular distance; to deactivate the cruise control, the driver turns the cruise control switch OFF. Further, when the driver depresses the brake pedal during cruise control or when a predetermined conditions are met, the cruise control is deactivated regardless of the operation of the cruise control switch.

Based on the calculation result of the cruise control, the ADAS 10 outputs a cruise braking request, which is the brake required torque, to the braking force control device 20. Further, because the vehicle of the first embodiment is equipped with an electric motor as the drive source, it is possible to generate not only drive torque but also regenerative braking torque. Thus, based on the cruise control, the ADAS 10 outputs a cruise drive request, which is the drive source required torque, and the cruise braking request, which is the brake required torque, to the driving force controller 31. For example, the braking torque is borne by the driving force controller 31 up to a preset prescribed braking torque range, and the braking force control device 20 generates the remaining amount of braking torque that is lacking for the required braking torque. Further, the vehicle of the first embodiment has a one-pedal control mode in which drive torque is generated when the accelerator pedal is depressed and braking torque is generated when the accelerator pedal is released, and when the one-pedal control mode is selected, the electric motor for driving 33 generates the drive torque and the braking torque. If the accelerator pedal is released all at once during the one-pedal control mode, a strong regeneration mode which requires a large regenerative torque is implemented.

The braking force control device 20 has a braking force controller 21 and a brake actuator 200 serving as an electric brake booster that supplies brake fluid pressure to the wheel cylinder of each wheel. The brake actuator 200 has a piston 201 connected to a brake pedal 204, a brake motor 202 that assists the pressing force of the piston 201, a master cylinder 203 that stores the brake fluid pressed by the piston 201, and a ball screw mechanism 205. Although a ball screw mechanism is employed in the first embodiment, it is not limited to a ball screw mechanism, and any mechanism that converts rotational torque into axial force may be employed.

The brake actuator 200 of the first embodiment generates rotational torque in the brake motor 202, and converts this rotational torque into a pressing force in the direction of the piston stroke by means of the ball screw mechanism to assist the brake pedal depression force of the driver. Thus, even if the driver is not operating the brake pedal, when brake fluid pressure is generated in accordance with the requirement of the cruise control, the brake pedal 204 makes a stroke as the rotational torque of the brake motor 202 is generated. Further, the brake actuator 200 has a stroke sensor 207 that detects the amount of stroke of the brake pedal 204, and a brake switch 208 that is turned ON when the brake pedal 204 is depressed by at least a prescribed amount, and is turned OFF otherwise.

The braking force controller 21 carries out boost control (EBA) that assists the brake pedal depression force of the driver, wheel antilock control, and vehicle dynamic control (VDC) based on a stroke signal from the stroke sensor 207. Further, based on the cruise braking request from the ADAS 10, the brake actuator 200 is actuated to realize the requested braking torque. Further, when the braking torque is generated based on various driving assist controls regardless of the driver's brake pedal operation, the braking force controller 21 outputs an automatic brake determination signal to the driving force controller 31. Similarly, when it is determined that the driver has operated the brake pedal 204 based on a signal from the stroke sensor 207, the braking force controller 21 outputs a braking operation determination signal to the driving force controller 31.

A body control module (hereinafter referred to as BCM.) 40 is connected to various other control modules via a communication line and receives information from the various other control modules and transmits information of the BCM 40 to the various control modules. The BCM 40 receives an ON/OFF signal of the brake switch 208 provided in the braking force control device 30, and outputs same to the driving force controller 31.

The driving force control device 30 has the driving force controller 31, an inverter 32, and the electric motor for driving 33. The driving force controller 31 accepts a cruise braking force request and a cruise driving force request from the ADAS 10, and receives an automatic brake determination result and a brake operation determination result from the braking force controller 21. When the driving force is controlled based on the accepted signal and a prescribed set of conditions is met, acceptance of the cruise driving force request is prohibited, a preset coasting torque control is executed, and braking torque, for which a prescribed upper limit value is set, is output.

Figure 2:
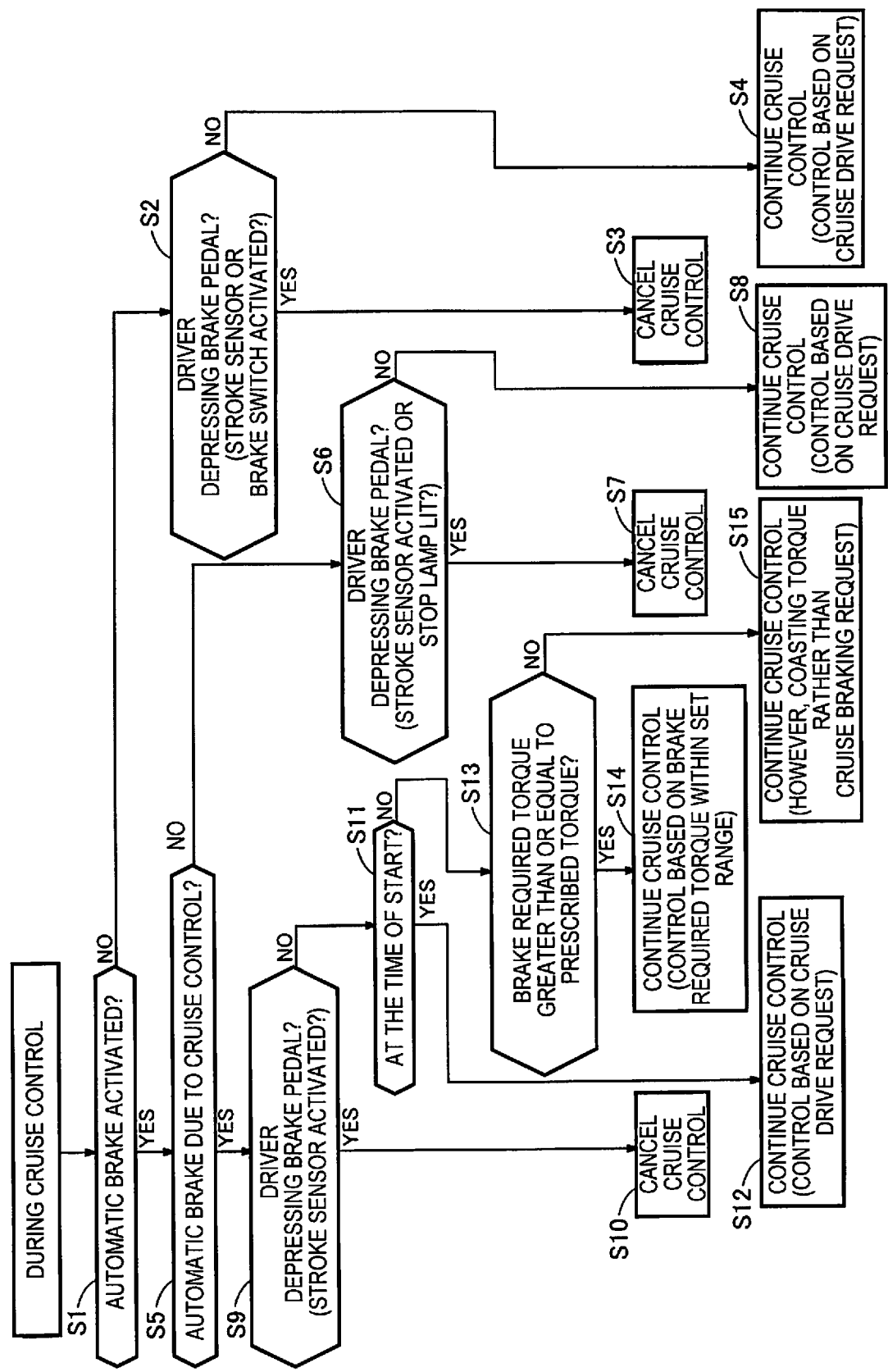
FIG. 2 is a flowchart showing a driving force control process during cruise control that is executed in a driving force controller 31 of the first embodiment.

FIG. 2 is a flowchart showing a driving force control process during cruise control that is executed in the driving force controller 31 of the first embodiment.

In Step S1, it is determined whether automatic braking is in operation, the process proceeds to Step S5 if it is in operation, and the process proceeds to Step S2 if it is not in operation.

In Step S2, it is determined whether the driver is depressing the brake pedal 204, the process proceeds to Step S3 if it is depressed, and the process proceeds to Step S4 if it is not depressed. Here, whether the brake pedal 204 is depressed when the automatic brake is not operated is determined based on an operation of the stroke sensor 207 or an ON signal of the brake switch 208.

In Step S3, cruise control is deactivated.

In Step S4, cruise control is continued, and vehicle driving force based on the cruise driving force request is generated.

In Step S5, it is determined whether the operation of the automatic brake is based on a cruise control request, the process proceeds to Step S9 in the case of a cruise control request, and in other cases (such as an automatic brake request by means of vehicle dynamic control), the process proceeds to Step S6.

In Step S6, it is determined whether the driver is depressing the brake pedal, the process proceeds to Step S7 if it is depressed, and the process proceeds to Step S8 if it is not depressed.

In Step S7, cruise control is deactivated.

In Step S8, cruise control is continued. Specifically, a cruise driving force request from the cruise control is accepted.

In Step S9, it is determined whether the driver is depressing the brake pedal, the process proceeds to Step S10 if it is depressed, and the process proceeds to Step S11 if it is not depressed.

In Step S10, the cruise control is deactivated.

In Step S11, it is determined whether the vehicle is starting to move, the process proceeds to Step S12 if it is determined to be starting to move, and the process proceeds to Step S13 otherwise. Here, whether the vehicle is starting to move is determined based on whether the vehicle speed is less than or equal to a prescribed vehicle speed that represents the time of starting. When the vehicle starts to move, because there are cases in which rollback prevention torque is set on an uphill road, there is the risk that discomfort will be imparted to the driver if the vehicle is controlled using coasting torque. Thus, a request is accepted from the ADAS 10 at the time of starting to ensure a stable starting state.

In Step S12, cruise control is continued. Specifically, a cruise driving force request from the cruise control is accepted.

In Step S13, it is determined whether the brake required torque from the ADAS 10 satisfies the condition of greater than or equal to a prescribed torque (a greater deceleration than a prescribed deceleration a), the process proceeds to Step S14 if the condition is satisfied, and the process proceeds to Step S15 otherwise. In Step S13, coasting torque is used as the prescribed torque.

In Step S14, the cruise control is continued. However, the driving force controller 31 accepts a brake required torque within a range of deceleration that is smaller than a preset prescribed deceleration b (deceleration greater than a).

In Step S15, cruise control is continued. However, the driving force controller 31 prohibits acceptance of the drive source required torque output from the cruise control in the ADAS 10, and controls the torque to a preset coasting torque (torque when the accelerator pedal is released).

Figure 3:
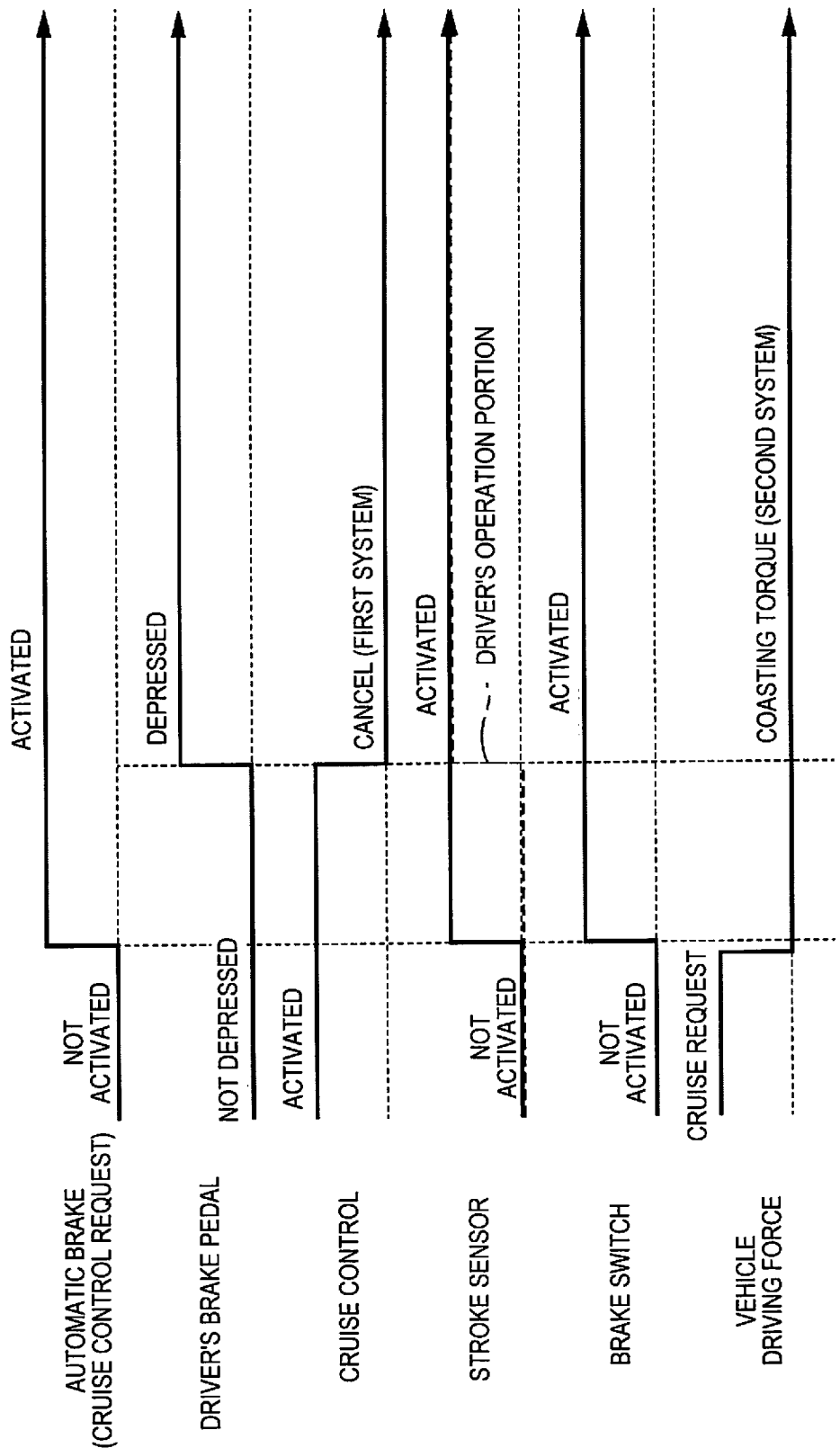
FIG. 3 is a timing diagram showing an example of the driving force control process during cruise control that is executed in the driving force controller 31 of the first embodiment.

FIG. 3 is a timing diagram showing an example of the driving force control process during cruise control that is executed in the driving force controller 31 of the first embodiment. The initial state of the timing diagram is a state in which automatic braking by the cruise control is not activated, the driver is not depressing the brake pedal, cruise control is activated, a brake pedal stroke accompanying the driver's brake pedal operation is not generated, the brake switch is OFF (not activated), and the driving force controller 31 is accepting a cruise drive request.

When automatic braking by the cruise control is activated at time t1, the stroke sensor 207 detects a stroke of the brake pedal 204, and the brake switch 208 turns ON. At this time, because the vehicle is not starting and the brake required torque is not at least a prescribed amount, the cruise control is continued. However, the driving force controller 31 prohibits acceptance of the cruise drive request output from the control and carries out coasting torque control. In the conventional technology, when the stroke sensor 207 detects a stroke of the brake pedal 204 and the brake switch 208 turns ON, it is determined that two conditions representing the driver's brake pedal operation have been satisfied, and the cruise control is canceled. In contrast, in the first embodiment, since cases in which the ON state of the brake switch 208 is not based on the driver's operation are included, it cannot be said that the two conditions representing the driver's brake pedal operation are satisfied, even if the brake switch 208 is turned ON. Thus, in the first embodiment, even if the above-described two conditions are satisfied, the cruise control is not released, and acceptance of the cruise drive request is prohibited. Therefore, unintended acceleration can be avoided while cruise control is continued.

When the driver depresses the brake pedal 204 at time t2, the stroke sensor 207 detects a stroke of the brake pedal 204 and deactivates cruise control. That is, in a state in which the driving force controller 31 prohibits acceptance of the cruise drive request in advance, cruise control is canceled based on one piece of information of the stroke sensor 207. Thus, it is possible to secure a redundant system when a cruise control deactivation determination is made.

As described above, the first embodiment has the following effects.

(1) The driving force controller 31 (drive source control unit) that controls the drive torque of the electric motor for driving 33 (drive source) that drives a vehicle, the stroke sensor 207 that detects a stroke amount of the brake pedal 204, the brake switch 208 that output an ON signal when the brake pedal is depressed 204, the braking force controller 21 (braking control unit) that controls the brake actuator 200 (electric brake booster) that is configured to execute automatic braking control in which a stroke of the brake pedal 204 results when the required braking torque is generated regardless of the brake pedal operation of the driver, and boost control that assists an operation of the brake pedal by the driver, and the ADAS 10 (cruise control unit) that calculates a brake required torque and a drive source required torque necessary for constant speed travel or travel to follow a preceding vehicle, outputs the drive source required torque to the driving force controller 31, carries out cruise control for outputting the brake required torque to the braking force controller 21, and deactivates the cruise control when it is determined that the driver has operated the brake pedal 204 during the cruise control are provided, wherein the driving force controller 31 prohibits acceptance of the drive source required torque from the ADAS 10 when the automatic braking control is activated during cruise control.

Thus, in a state in which the driver is not depressing the brake pedal 204, even if the brake switch 208 turns on due to automatic braking control and depression of the brake pedal by the driver cannot be detected based on the brake switch 208, the driving force controller 31 can prohibit acceptance of the drive source required torque in advance, and thereby ensure a redundant system when a suspension of the cruise control is being determined.

If automatic braking control is activated during cruise control, in the first embodiment, the driving force controller (drive source control unit) prohibits acceptance of the drive source required torque from the cruise control unit, but the same action and effects can be realized by means of the cruise control unit not outputting the drive source required torque to the driving force controller (drive source control unit).

(2) The driving force controller 31 accepts drive source required torque from the ADAS 10 when the vehicle speed becomes less than or equal to a prescribed vehicle speed during prohibition of acceptance of the drive source required torque from the ADAS 10.

That is, when the vehicle starts to move, since there are cases in which rollback prevention torque is set on an uphill road, a request is accepted from the ADAS 10 to thereby ensure a stable starting state.

(3) When the automatic braking control is activated during cruise control and the brake required torque is greater than or equal to a prescribed torque (deceleration greater than a prescribed deceleration), the driving force controller 31 accepts brake required torque from the ADAS 10 and controls the electric driving motor 33 to be within a preset brake required torque (deceleration) range.

Therefore, unintended acceleration can be prevented while cruise control is continued. Further, when a large deceleration is required during cruise control, a highly stable control configuration can be obtained by emphasizing control by the braking force controller 21, rather than the driving force controller 31.

The invention claimed is:

1. A vehicle control method comprising:
controlling a drive torque of a drive source that drives a vehicle using a drive source controller;
detecting a stroke amount of a brake pedal using a stroke sensor;
controlling automatic braking when a required braking torque is generated regardless of a brake pedal operation by a driver using a braking force controller;
outputting an ON signal using a brake switch when the brake pedal is depressed due to the brake pedal operation by the driver and when an operation of the automatic braking; and
calculating a brake required torque and a drive source required torque necessary for constant speed travel or travel to follow a preceding vehicle;
outputting the drive source required torque to the drive source controller;
outputting the brake required torque to the braking force controller to perform cruise control; and
prohibiting acceptance of the drive source required torque when the automatic braking control is activated during the cruise control, or not outputting the drive source required torque to the drive source controller when the automatic braking control is activated during the cruise control.

2. The vehicle control method according to claim 1, wherein
the drive source controller accepts the drive source required torque from the cruise control unit when the vehicle speed becomes less than or equal to a prescribed vehicle speed during prohibition of acceptance of the drive source required torque from the cruise control unit.

3. The vehicle control method according to claim 1, wherein when the automatic braking control is activated during cruise control and the drive source required torque is a deceleration that is greater than a prescribed deceleration, the drive source controller controls the drive source such that the torque becomes a preset prescribed coasting torque instead of the drive source required torque.

4. A vehicle control device comprising:
a drive source controller configured to control a drive torque of a drive source that drives a vehicle;
a stroke sensor that detects a stroke amount of a brake pedal;
a braking force controller configured to control automatic braking when a required braking torque is generated regardless of a brake pedal operation by a driver;
a brake switch that output an ON signal when the brake pedal is depressed due to both the brake pedal operation by the driver and an operation of the automatic braking; and
a cruise controller configured to calculate a brake required torque and a drive source required torque necessary for constant speed travel or travel to follow a preceding vehicle, the cruise controller being configured to output the drive source required torque to the drive source control unit, and the cruise controller being configured to perform cruise control for outputting the brake required torque to the braking force controller,
the drive source controller being configured to prohibit acceptance of the drive source required torque from the cruise controller when the automatic braking control is activated during the cruise control, or not output the drive source required torque to the drive source controller when the automatic braking control is activated during the cruise control.

5. The vehicle control device according to claim 4, wherein
the drive source controller is configured to accept the drive source required torque from the cruise control unit when the vehicle speed becomes less than or equal to a prescribed vehicle speed during prohibition of acceptance of the drive source required torque from the cruise control unit.

6. The vehicle control device according to claim 4, wherein
when the automatic braking control is activated during cruise control and the drive source required torque is a deceleration that is greater than a prescribed deceleration, the drive source controller is configured to control the drive source such that the torque becomes a preset prescribed coasting torque instead of the drive source required torque.

* * * * *